(12) United States Patent
Graf

(10) Patent No.: US 11,334,848 B2
(45) Date of Patent: May 17, 2022

(54) COMMITMENT PROCESS TO GENERATE JOINTLY SUPPORTED DECISIONS

(71) Applicant: Richard Graf, Koenigstein im Taunus (DE)

(72) Inventor: Richard Graf, Koenigstein im Taunus (DE)

(*) Notice: Subject to any disclaimer, the term of this patent is extended or adjusted under 35 U.S.C. 154(b) by 631 days.

(21) Appl. No.: 16/227,483

(22) Filed: Dec. 20, 2018

(65) Prior Publication Data
US 2019/0205836 A1    Jul. 4, 2019

Related U.S. Application Data

(60) Provisional application No. 62/613,638, filed on Jan. 4, 2018.

(51) Int. Cl.
*G06Q 10/10*    (2012.01)
(52) U.S. Cl.
CPC .................................. *G06Q 10/10* (2013.01)
(58) Field of Classification Search
CPC ...................................................... G06Q 10/10
See application file for complete search history.

(56) References Cited

U.S. PATENT DOCUMENTS 8,635,207 B2 * 1/2014 Marlin ................... G06Q 50/26
707/719

OTHER PUBLICATIONS

Graf, Bring about joint decisions with the digital KiE-DecisioMaker (Year: 2020).*
Likert, https://www.alchemer.com/resources/blog/likert-scale-what-is-it-how-to-analyze-it-and-when-to-use-it/ (Year: 2012).*
Rushkoff, https://www.shareable.net/infographic-the-why-how-of-community-land-trusts/ (Year: 2014).*

* cited by examiner

*Primary Examiner* — Aryan E Weisenfeld
(74) *Attorney, Agent, or Firm* — Squire Patton Boggs (US) LLP

(57) ABSTRACT

The invention relates to a commitment process for efficiently generating a jointly supported decision. The commitment process comprises the following steps: Generating requirements for the commitment process, at least including a decision whether a quality of a call of decision is sufficient; when the call of decision quality criteria is met, deciding about a comprehension in the commitment process; when a common comprehension on the commitment is agreed, deciding about a first commitment; when no commitment is achieved: discovering objections concerning the first commitment; transforming the discovered objections into measures; deciding about the first commitment including the transformed measures; if no commitment is achieved, decide whether a commitment can be achieved at all and, if the commitment cannot be achieved, abort the commitment processed; or in all other cases repeat the steps of discovering, transforming and deciding about the commitment including the transformed measures; if a commitment is achieved, generate the jointly supported decision. A decision making software application for leading the Commitment-Process, designing and generating questions, collecting and protocolling each answer from each participant as a cloud based service is also provided herewith.

2 Claims, 10 Drawing Sheets

1011

1014

1016

103

104

104-1

Do you understand the content of the objection(s)

104-2

Is a commitment achievable when the objection(s) are solved

COMMITMENT PROCESS TO GENERATE JOINTLY SUPPORTED DECISIONS

PRIORITY CLAIMS AND RELATED PATENT APPLICATIONS

This application claims the benefit of priority to U.S. Provisional Application Ser. No. 62/613,638, filed on Jan. 4, 2018, the entire content of which is incorporated herein by reference.

TECHNICAL FIELD OF THE INVENTION

The invention is in the field of commitment processes and in particular in the field of commitment processes suitable to efficiently generate jointly supported decisions. A decision-making software application for leading the Commitment-Process, designing and generating questions, collecting and protocolling each answer from each participant as a cloud based service is also provided herewith.

BACKGROUND OF THE INVENTION

Valuable decisions are key requirements for success. Valuable decisions lead to accomplishing external and internal challenges, e.g. when managing a project. Especially the ongoing digitizing of agile business methods rise a demand of valuable decisions. Valuable decisions are those decisions that are commonly agreed on, meaning that each individual participant in a decision-making process manufacture the commonly supported decision that has been made and supports the measures that may have been defined therewith. Valuable decisions are achieved during a commitment process which leads to a commitment given from each individual participant.

Valuable decision distinguishes from non-valuable decisions by achieving at least one positive effect and so, attaining a commonly defined goal. In most cases, a valuable decision only is a first step in a sequence of transformation processes. At the end of such transformation processes, the goal should be attained.

A valuable decision will be manufactured with all participants. A valuable decision is generated in a reasonable amount of time. In doing so, it is more geared to the commitment of the participants to achieve the positive effect than to rational justification.

Generating a valuable decision requires an appropriate decision-making process that is flexible for different challenges and at the same time is robust for specific challenges and tasks. This decision-making process is always committed to the goal to be achieved and must be made comprehensible. It is to create an unchanged process documentation that allows any resumption of the decision-making process and thus severely limits evasive retreats.

A valuable decision is a jointly supported decision. A natural conflict between security and opportunity or between individual and superordinate consequences for a decision-making participant leads to a dynamic that must be considered and resolved in a decision-making process for a valuable decision.

Such a dynamic throughout the participant—may be referred to as group dynamic—in the various natural conflicts hampers a solid and robust decision-making process or possibly blocks the motives of individual participants in the decision-making process in such a way that non-valuable—so to say disadvantageous or worse—decisions are made. Therefore, a decision-making process is needed that creates a new sustainable decision-making culture. A decision-making system that controls the decision-making process should functionally align the group's dynamics with motives so that each individual participant is equally enabled in the decision-making process to responsibly design deliberate changes.

The hitherto known decision-making processes so far only function according to a classical concept of leadership, psychology and pedagogy. So far, those processes merely consider rational decisions and rational logic, statistical forecasts and cognitive algorithms. So far, emotional motives (referred to below as motive) and the associated emotion logic are not considered.

Such processes do not recognize non-valuable or even false decisions. This can be observed by the following dysfunctional decision phenomena: confirmation errors (information is sought to confirm existing/established attitudes and to neglect contradictory evidence); Look back error (distortion of a user's forecast); Control illusion (if a random event was influenced by conscious control); Halo effect (further properties are concluded from known features); Probability distortion (overestimation of a participant performance) and many more. The dysfunctional decision phenomena are summarized under cognitive decisions or cognitive dissonance. The invention focuses on not letting the dysfunctional decision phenomena arise or correcting them in an inventive commitment process.

So far, companies are predominantly conservative when making a decision that automatically leads to more second-best than valuable decisions. The known decision-making processes takes too long, and they are sometimes not supported on by each individual participant. The desired effect is missed. In addition, the entrepreneurial world is becoming more and more complex, it is changing faster and faster, it is becoming more ambiguous and unpredictable, and more and more people are taking part in the decision-making process, for example due to increasing digitization.

On the one hand, digitization is forcing the disruptive changes due to machine-human communication and, above all, machine-machine-communication. Thus, artificial intelligence (AI), which is now gaining serious importance, requires commitment processes that are automated. Already known agile working methods, such as SCRUM or KAN-BAN, lead to a fundamental paradigm shift in a project approach and at the same time force an agile leadership behavior at eye level in flat hierarchies. Contradictory leadership paradigms from traditional authoritarian leadership and agile leadership now require completely new automated decision management and commitment processes.

In addition, teams are required to integrate their complete group competence, also called swarm intelligence. The group competence arises from the ability of the individual participants to bring their competences into a commonly shared decision and thus supports a group diversity. The invention regulates that these competences are introduced or claimed in an orderly commitment process.

The object of the present invention is to design a commitment process which efficiently and effective generates a commonly supported decision produces with a different number of participants. In this case, the commitment process should guide the decision-making process between individual participants in such a way that no decision-making phenomena occur that may adversely affect the decision. The automated commitment process and its valuable decision algorithms for machine-human-communication, human-machine-communication and especially machine-machine-communication may be implementable in machines. The computer system aims to foster future decision-making culture, bring together traditional and agile methods and foster group intelligence.

SUMMARY OF THE INVENTION

The above identified object is solved by the features of the independent claims.

According to an aspect of the invention, a commitment process for efficiently generating a jointly supported decision is proposed. The commitment process comprises the following steps: Generating requirements for the commitment process, at least including a decision whether a quality of a call of decision is sufficient; when the call of decision quality criteria is met, deciding about a comprehension in the commitment process; when a common comprehension on the commitment is agreed, deciding about a first commitment; when no commitment is achieved: discovering objections concerning the first commitment; transforming the discovered objections into measures; deciding about the first commitment including the transformed measures; if no commitment is achieved, decide whether a commitment can be achieved at all and, if the commitment cannot be achieved, abort the commitment processed; or in all other cases repeat the steps of discovering, transforming and deciding about the commitment including the transformed measures, wherein a master in the commitment process aborts the commitment process after a predetermined number of repetitions; and if a commitment is achieved, generate and/or output the jointly supported decision.

The term "commitment" is inventively meant as follows: People, especially experts, may give their commitment if they themselves are convinced of the success and the sustainability of an enterprise. The measures necessary for a success may now be integrated in the inventive commitment process. It can increase the self-perceived identification and commitment to use one's own abilities to attain a goal. The identification and loyalty to that goal is the essential success factor par excellence. The effort for control and control can decrease significantly and can lead the communication with each individual participant into a new dimension. The speed of decisions significantly increases. Now, an employee motivation is not a consistent result of successful decisions and their implementation and a first central building block for self-organization and ownership. Reservations, risks and hidden conflicts that cause increases and delays in subsequent stages of the project—e.g. after significant investments have already been made—can be identified in very early stages and counteracted before the project even starts. The measures to ensure success are worked out together and thus are jointly supported on, so, each participant agrees on the decided measures. The effect in the subsequent implementation is central to the success. All participants are involved with their commitment, and the process forces everyone to speak out and take a viewable stance. Divergent perspectives are visible right from the beginning and, through the participation and participation of all, they lead to a common constructive solution.

The commitment process can be integrated into a computer system. The computer system may comprise system components that simulate the participants. These components may have at least a first motive profile for providing participant dependent intermediate decisions under motivational profile-dependent evaluation of the decision to be decided.

Commitment process in this content basically means the process of self-perceived obligation to bring one's own abilities in, to attain a goal. A jointly supported decision includes the decision and its implementation, which also needs to be commonly supported. Identification and loyalty to the common objective are the essential success factor par excellence. They significantly reduce the effort for control and monitoring and are a first central building block for self-organization, ownership and automation. People, employees and, experts only give a commitment if they themselves are convinced of the success and sustainability of the enterprise. The measures necessary for success are now integrated into the commitment process. Reservations, risks and hidden conflicts are identified at an early stage, which reduces costs and reduces delays. The achieved positive effect in such an implementation is a central aspect to the success. The term "jointly supported" herein reflects that the decision has been commonly agreed upon by each participant, which means that the decision has been made in common with each participant and additionally that this decision is borne by each participant. So, it becomes a liable and supported decision, too.

The commitment process involves all participants, and the process forces everyone to provide an opinion and to take a transparent stance. Divergent perspectives are transparent right from the beginning and, through the participation of all required authorities, they lead to a common constructive solution. The compelling inner logic leads to the goal to be attained and makes the commitment process a solid, robust tool that copes well with blurring, different and adverse situations. The commitment process creates a self-organized process that grows a culture of openness, commitment, honesty, security, and shared commitment.

The goal of jointly supported decisions is achieved in a clear process. Reservations/Objectives, risks and hidden conflicts become transparent at an early stage, causing later increases in costs and expenses, and delays if significant investments have already been made. The commitment process involves all participants, and the process forces everyone to speak out and take a viewable stance. Divergent perspectives are transparent right from the beginning and, through the participation and participation of all, they lead to a common constructive solution.

A quick, open assessment of the situation shows the extent to which the commitment in this body can be achieved. Thus, failure in later phases is unlikely and options that are tactically enforced due to lack of time or resources are largely prevented. Protection against failure inherent in reservations and risks is valued and transformed into success factors in a transfer process. The automatically generated documentation enables clear and open communication, easy restart points after interruptions, and provides easy tracking and targeted follow-up. The clear and accepted structure allows for an iterative execution through assumptions without full participation and availability of expert knowledge. The compelling inner logic leads to the goal and makes the commitment process a solid and robust tool that copes well with blurring and different as well as adverse situations. The commitment process creates a self-organized process that grows without forcing a culture of openness, commitment, honesty, security, and shared commitment.

This commitment process can be implemented as a software solution, e.g. a cloud-based service. So, an appropriate application should be used or installed and running on a terminal device, e.g. a handheld device, or personal computer. This application automates, guides and protocols each step in the commitment process This application may be used to guide a master of the commitment process through the commitment process.

A system component of the computer system may represent a human decision-making behavior a and may map this behavior to a computer logic via different decision-making sub-systems, e.g. an emotion system and a cognition system. These different decision-making systems in one system component work in parallel, largely autonomously and come to different decisions at different times, based on different information and memory systems. Both decision-making systems process the same input parameters, for example a stimulus, in different ways and come to their own evaluation and specific meaning. A first decision system of a system component may process the stimulus according to a first computational logic, for example according to a statistical prediction or a heuristic procedure. The first logic is called cognitive logic or rational logic. A second decision system of the same system component may process the same stimulus according to a second logic, for example an emotion logic or less rational logic, for example based on motifs. The processing of the stimulus in the second logic may be fast, effortless, unsolicited and/or inaccessible to the conscious. The first logic, the cognitive system may process the same stimulus consciously and slowly. The cognitive system could be seen as a complex and multi-branched knowledge store using heuristic, analytical and statistical processes in the system component, which must be additionally activated. On the other hand, the second logic may be, for example, a spontaneous assessment based on the motive of the system participant. Both logics process the stimulus in parallel and influence each other.

BRIEF DESCRIPTION OF THE DRAWINGS

In the following exemplary embodiments of the invention are described with reference to drawings. Those exemplary embodiments do not limit the scope of the invention. The same reference signs in different drawings indicate the same elements or at least the same functions unless otherwise stated.

DETAILED DESCRIPTION OF THE INVENTION

Figure 1:
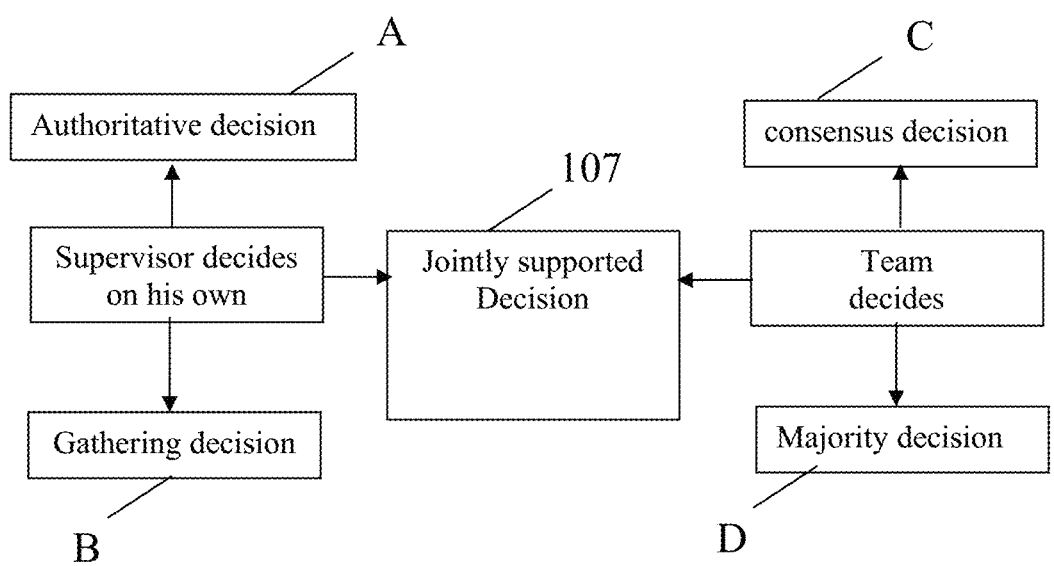
FIG. 1. An exemplary overview of different types of decisions.

In FIG. 1, an exemplary overview of different types of decisions is shown. As shown therein, decisions can basically be divided into four types of decisions A, B, C, D and a jointly supported (a shared) decision 107. An authoritative decision A is a classic management style in which a supervisor makes the decision by himself and expects his staff to execute this authoritative decision. A gathering decision B is also an authoritarian decision that involves key players and experts. These key players and experts are previously independent of each other or are interviewed together—mostly without obligation. In a gathering decision B, an authoritative decision is still made by the manager but in contrast to decision A it is now made in view of an extended informational situation. Although there is some involvement lately, the decision types A and B remain with an authoritarian leader.

These types of decisions A and B have become standard with the emergence of post heroic leadership. The authoritarian decision A offers some clear advantages, but it is only of limited use. With the generation change, it is no longer contemporary. Coping with the challenges of digitization is therefore not possible. Not to mention that a single decision-maker often poses a great risk for companies.

Consensus decisions C refers to a group that makes a decision with the express consent of all or it makes a decision without dissent. In a majority decision D, a group makes a decision with absolute, simple, relative or qualified majority. In contrast to the decisions A or B, the largest or predominant part of a team decides.

Both, the consensus decision C and the majority decision D are not suitable for entrepreneurial decisions. The consensus decision C takes far too long and content is usually agreed on the lowest common denominator, which is not enough for successful companies. The majority decision D is slightly better. Although it can be produced within a reasonable time, it disqualifies itself primarily by being an authoritarian decision for the minority, which means that majority decisions D are not subsequently agreed by all participants, which may lead to blockade or dilution. Even if the majority decision D compensates for weaknesses of the authoritarian decision A, it still remains an authoritarian decision at its core.

A decision type that is discussed herein is a jointly supported (shared, joint) decision 107. Here, a team creates a decision in the inventive commitment process with 100% participation. All participants give the support to that decision.

Such a decision 107 may be explained as follows. Leadership means setting goals, inspiring people to achieve those goals, and achieving those goals. The core of the leadership, however, is to make a decision that gets the implementation going. It is important for good leadership that employees understand the business process. They must be held accountable for their contribution to value creation. Leadership is often confused with power of leading, with the power to make a decision alone. Leadership, on the other hand, is an ability to make shared decisions.

Leadership is usually different: Executives are often satisfied when they have finally made a decision in difficult situations. At a very late stage, e.g. in the implementation or at the result stage it turns out that it was not valuable decision. A decision 107 can now be measured at the time it was hit, by the number of participants who jointly supported the decision 107. A valuable decision 107 is not put to the vote, it comes according to the inventive commitment process 100. The decision 107 can still made by the manager, however, through a reliable process 100 controlled by the executive. The decision 107 is no longer made, but the abilities of all participants are used, to manufacture the valuable decision. Only in a case where no commonly shared decision can be made, the executive authority decides authoritatively.

The different decision types A, B, C, D, 107 all have specific advantages and disadvantages. Their limitations eventually disqualify them as inappropriate or conditional enough to handle the challenges in a business. It may be a part of the inventive commitment process to decide which of the types of decisions should be chosen. It may for instance be asked to all participants, whether following parameters can be reached with each specific type of decision, such as: decision speed; valuably; group competence; full participation required; retaining of power; deactivation of blockades or dilutions of decisions.

Figure 2:
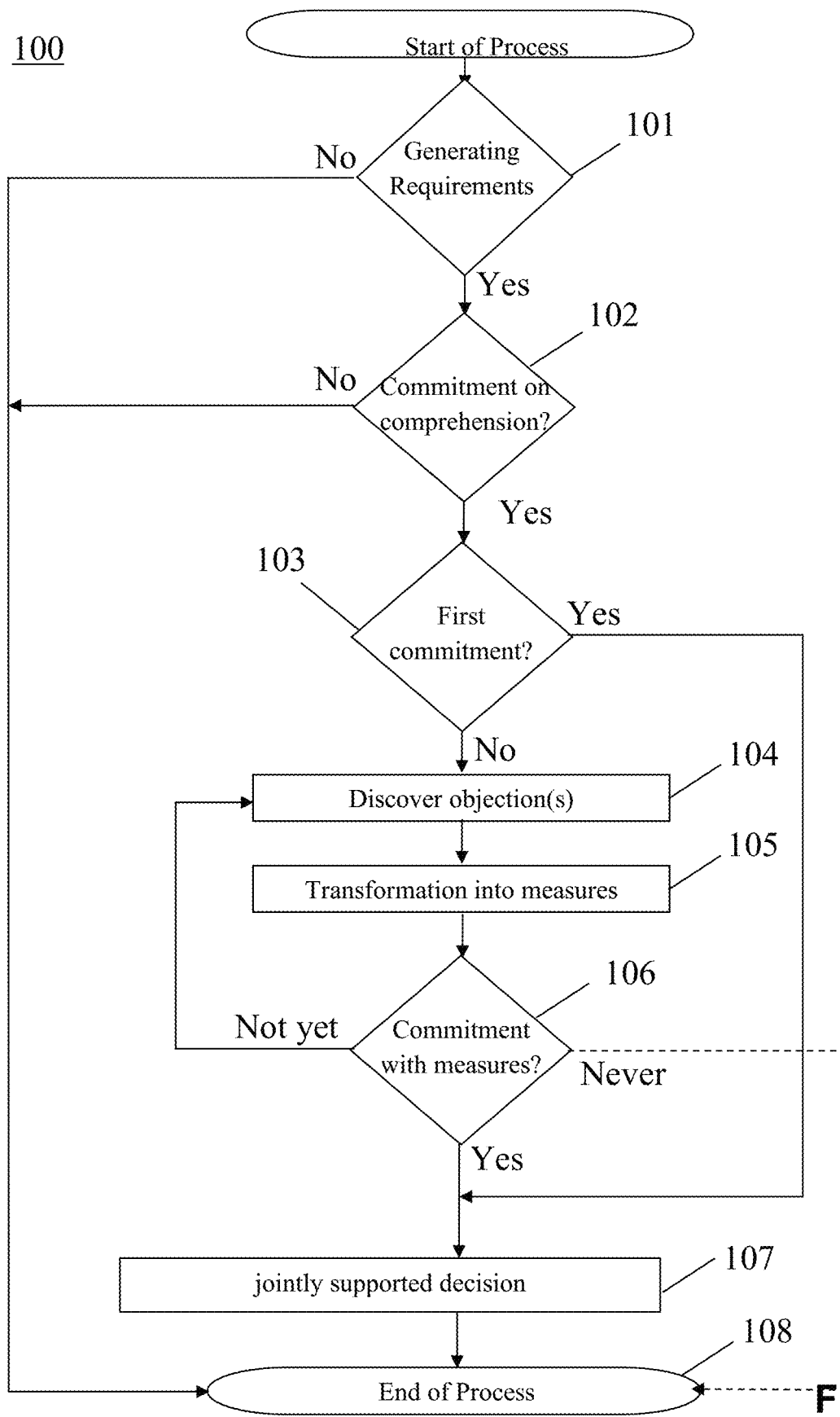
FIG. 2. A flow diagram of an exemplary embodiment of a commitment process according to the invention.

In FIG. 2, a flow diagram of an exemplary embodiment of a commitment process 100 according to the invention is shown. It is recommended that throughout the commitment process 100 a K-i-E scale based questionnaire is performed for documentation and appreciation of preparation; see FIG. 4 and FIG. 6 to FIG. 9. A rating with such K-i-E scale questions only takes several seconds. There are process steps 101 to 108 that describe how leaders and project leaders make a valuable decision 107 with a group of participants. The use of the commitment process 100 itself may be introduced with an own commitment process 100. The process 100 directly addresses the delicate issues without bypassing or losing himself in a formalism.

In step 101, a generation requirements step is processed. If it is decided in step 101 that the requirements for the commitment process 100 cannot be generated (No-case in decision step 101), the commitment process ends with step 108. So, in a very early stage of the commitment process 100 it is developed whether all necessary requirements can be generated to obtain a commonly shared decision 107. The step 101 is explained in greater details in FIG. 3. According to the inventive commitment process 111, in the YES-case of step 101, it has been clarified to what extent the prerequisites such as governance and cooperation in the team are guaranteed.

In the YES-case of step 101, a subsequent "commitment on comprehension" step 102 is processed. In this step 102 it is clarified whether the understanding on the commitment process 101 is obtained by all participants or is achieved in this step 102. If no commitment on comprehension (=prerequisites) can be made in step 102, the process ends with step 108. This step will be explained in greater details with FIG. 5.

In step 103 it is decided whether a first commitment for a first assessment is already determined. If a first commitment is already achieved in this step 103, a jointly supported decision 107 is already generated and the process ends with step 107. Here is the huge advantage of the inventive commitment process, namely that exhaustive and time-consuming discussion are totally ignored in a case where all participants in the commitment process are already committed. This step 103 will be explained in greater details later.

In a NO-case of the step 103, meaning no first commitment was obtained, the step 104 is processed and risks in view of the success of the commitment process 100 are identified by discovering existing objections in step 104. This step 104 will be explained in greater details in view of FIG. 6 below.

After the discovery of any objections, necessary measures are defined by transformation of the objections into such measures in step 105. These necessary measures according to step 105 are developed for the hedging of the risks.

In step 106, it is decided whether a final commitment is determined. The final commitment in step 106 is only a formal act if the steps 103 to 105 have been processed properly. However, in case no final commitment is decided, the steps 104 to 106 are repeated. A strength of the commitment process 100 according to the invention is the fact that a master of the commitment process 100 switches from the jointly supported decision-making process to an authoritive decision A (see above) when a predetermined number of repetitions are made, or the result of the final commitment does not change and still no final commitment is achieved. So, the master then decides in the NEVER case of step 106 that no final commitment will be possible in this situation and the commitment process 100 ends with step 108. This is not a failure of the process 100, it is merely the decision, not to decide which can be a valuable decision, too, especially in case of uncommittable participants.

Because of the commitment process, a decision 107 is made, on which each individual participant agrees on and an implementation phase as a success factor can be started.

Using the inventive commitment process allows that the decisions are no longer made authoritarian, gathering, consensus or majority decision, A, B, C, D. The decision 107 are made through a commitment process 100. Any adherence to the process 100, is taken over by the participants in that process 100 itself in a case the participants are familiar with the process 100. Otherwise a master (authoritative decision maker) takes over the process 100. So, in the very beginning of the commitment process 100, such a master should be identified and named. Executives are advised to delegate responsibility for the decision-making process to him in order to stand up to concentrate the content.

Inventively, the authoritarian leadership styles are now integrated into the jointly supported (shared) decision 107. It is irrelevant whether they come along post heroic or participative. The design of the commitment process 100 is advantageously used to determine at which stage of the commitment process 100, an authoritarian decision takes over the power or ensures governance, e.g. steps 101, 102 or 106. For certain situations and phases in the commitment process 100, a majority decision then is executed to accelerate the decision-making process.

Accordingly, the formal responsibility is maintained, and the commitment process ensures one appropriate safety thinking and a simultaneous involvement and clear delineation of any "sceptistics" as well as "conquestor for success". So, decisions are made in a timely manner with a growing understanding and joy. Emotional feelings such as guilt, shame or anxiety associated with failure are unpleasant and are avoided with this commitment process 100. So, an integrative leadership style is created that is the framework for a successful influence, because decisions 107 are made safely, efficient and generate a positive effect necessary for success.

Figure 3:
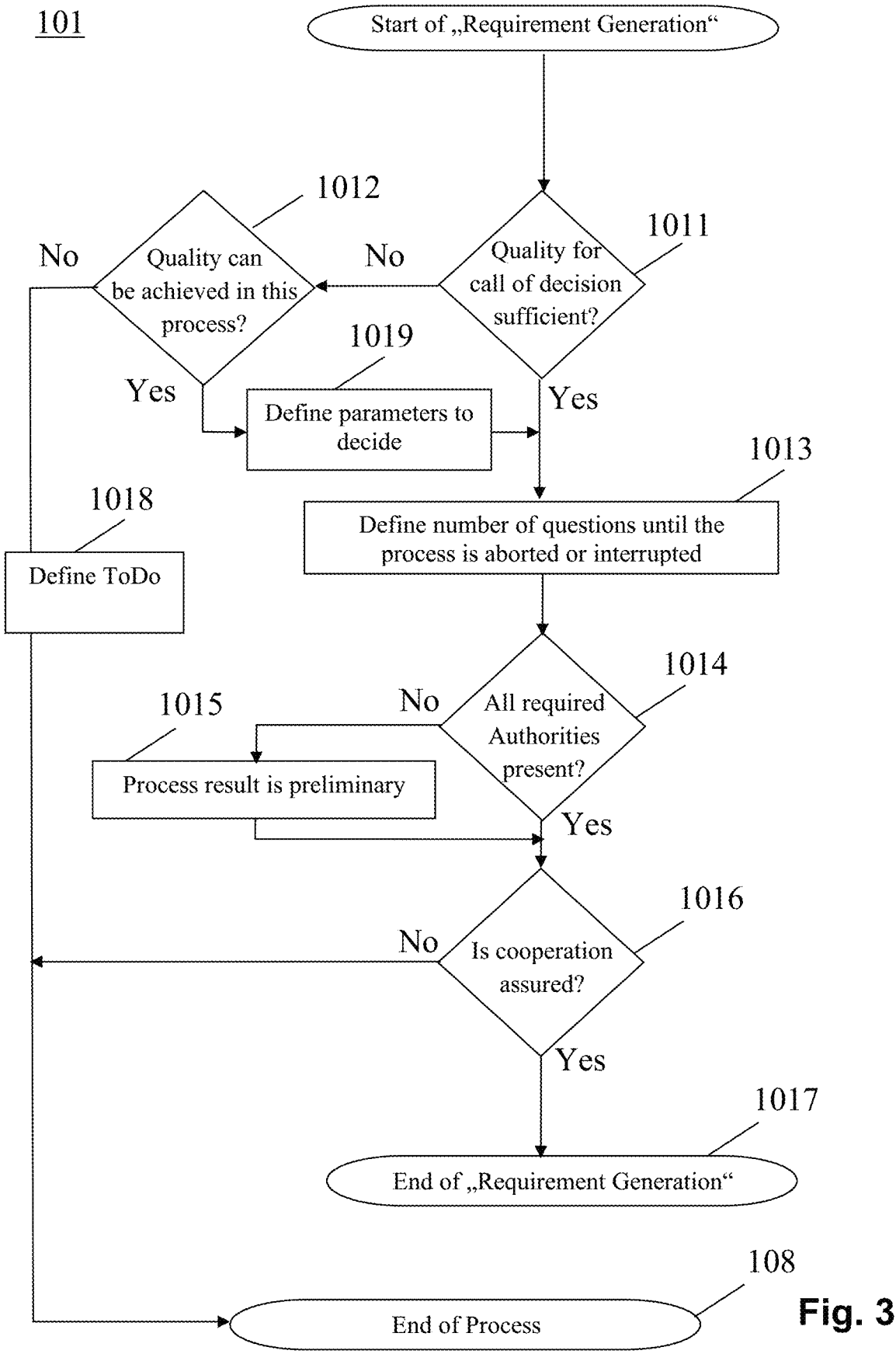
FIG. 3. A flow diagram of an exemplary embodiment of a requirement generation step of the commitment process of FIG. 2 according to the invention.

In FIG. 3, a flow diagram of an exemplary embodiment of a requirement generation step 101 of the commitment process 100 of FIG. 2 according to the invention is shown. Requirements have to be set for the company in the design. Typically, the quality of the decision requirements according to step 1011, the completeness of the participants according to step 1014 and the assurance of a cooperation according to step 1016 are typically clarified during this step 101. These prerequisites (=requirements), especially for regular meetings, should be carefully considered and oriented towards a functional minimum.

The commitment process 100 addresses precisely these issues and creates the prerequisites for teams to arrive swiftly and joyfully with the jointly supported decisions 107. Dealing with exceptional situations is also part of the commitment process 100.

Figure 4:
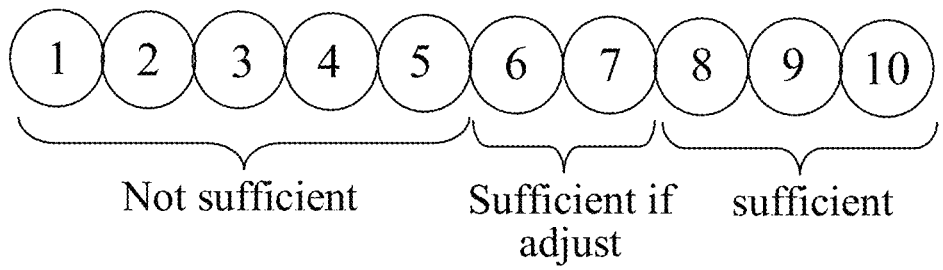
FIG. 4. Exemplary embodiments of K-i-E scales useful for the requirement generation step of FIG. 3 according to the invention.
Figure 4:
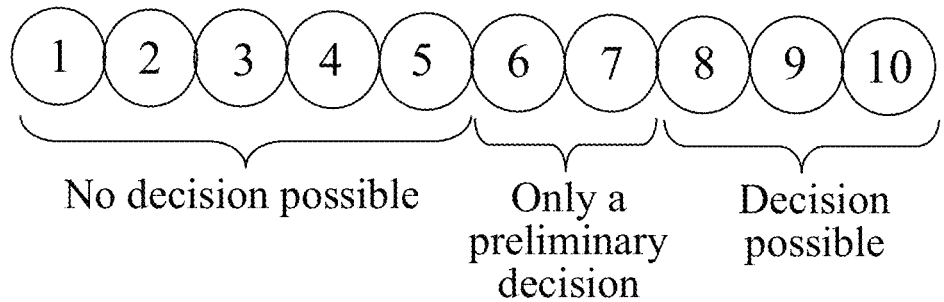
Figure 4:
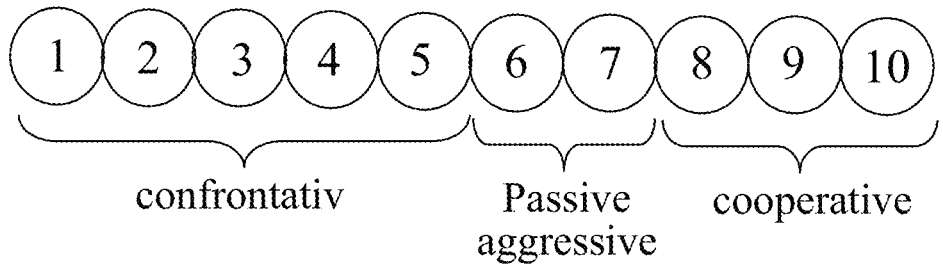

The generation of the requirements start with a decision whether a quality for a call of the decision to be made is sufficient, see step 1011. Here it is clarified to what extent the need for decision-making has sufficient quality and whether this was communicated to all participants in good time. For instance, a new quality process is used to ensure appropriate quality. The quality process is not part of this present patent application. In case, no quality process is used, it is a necessary measure to record the quality at the beginning of the process 100. For safety and esteem, it is recommended to always document the quality with a K-i-E scale for the decision step 1011 as shown in FIG. 4 as will be described later.

If it is decided in step 1011 that the quality is not met (NO-Case) it is determined in step 1012 whether the quality can be achieved within this actual commitment process. If it is decided in step 1012 that the quality requirements are not met (NO-Case), measure are defined and documented with step 1018 that enable to obtain the necessary quality. After the documentation of the items to do, the whole commitment process 100 ends with step 108. In case it is determined in step 1012 that the quality requirements can be met within this actual process (YES-case), parameters for this actual commitment process 100 are defined in step 1019.

If it is decided in step 1011 that the quality is met (YES-Case) or the parameters according to step 1019 are defined, it is determined in step 1013 how many questions in total can be asked until the commitment process 100 is terminated (aborted) or interrupted (timely based stopping). These defined number of questions may be used by the master of the commitment process 100 in a later stage.

In step 1014 another requirement is checked, namely whether all required authorities for the decision-making 107 are present. Incomplete participation, especially of those responsible and of experts, whether given or as a tactical measure, complicate and prevent the commitment process 100. In this step 1014 it is checked whether all responsible persons or their representatives are present. If not (NO-Case in step 1014), it is possible to define a representative for the missing authority in this actual commitment process 100 who subsequently carries out the commitment process 100 with the responsible person. The commitment process 100 is indicated as preliminary process in step 1015, but not aborted. This is a huge advantage of the inventive commitment process 100, since now, a commitment process 100 can then be started with reservations and completed with secure touchdown points.

Due to the clear structure and automatic documentation during the process 100, the preliminary commitment process 100 can be recirculated with confidential individual moderation or by repetition with partial staffing (that was missing). In a good case, the jointly supported decision 107 is confirmed. In the worst case, an already solid result is set up and if necessary the process needs to be repeated.

Late arrivals almost always cause frustration and annoyance among the waiting people and jeopardize the result. According to a study, 37% of meetings start later than planned. The costs amount to billions and a remedy would be so easily possible. According to step 1014 and the appropriate actions derived thereof, participants not showing up in a meeting do not influence the commitment process 100 and do not "punish" the participants that started on time. So, delays can be dealt with in the process 100 by the restart points as well as with missing participants.

The experience in implementation this step 1014 shows three things. Meetings begin and end punctually and sometimes even earlier. The meetings are fun again because work is done, and valuable decisions can be achieved. The culture of being late is stopped. The normative effect of the commitment process 100, which can be started on time, even if not all participants are present, leads to a new culture of inner commitment, made through the motives of the emotions, which supports a new decision-making culture. A K-i-E scale for the decision step 1014 of FIG. 4 expresses the possible outcome of the step 1014.

After step 1014, another requirement is decided in step 1016 of FIG. 3. Therein it has to be decided whether cooperation is assured by all participants. A cooperative attitude is a prerequisite for success as will be shown. A process 100 can be carried out cooperatively or confrontational. In this phase of the process 100 it is necessary that the process is made cooperatively throughout the participants. An attempt to build something cooperative with a confrontational counterpart in the process 100 is doomed to failure, causes pain and creates friction losses for all involved participants. However, a confrontational situation requires much more mindfulness, more accurate planning, and unassailable documentation than a cooperative situation. Designing or building something is often more time-consuming than preventing or destroying something. Conversely, the opportunities and freedoms in cooperative dealings are manifold and often permit unexpected solution spaces.

It is therefore important to recognize in which situation the process 100 is at the moment and is necessary to adapt a participant's behavior and control it. If action and measures are based on the prevailing attitude of all those involved—cooperative or confrontational—there is a good chance of success. The inherent logic of the commitment process exposes all participants to confrontational situations and leads to self-regulatory cooperative behavior. Cooperative behavior is achieved in the introductory phase without explicitly demanding or accelerating it. If the cooperation is agreed by the participants (Yes-case in step 1016), the requirement generation step 101 of the commitment process 100 ends with step 1017. Here, also a K-i-E scale for the decision step 1016 of FIG. 4 should be used. If a number of 8 to 10 is committed in step 1016, the commitment process 100 may continue in the functional area. If the result of the K-i-E scale for the decision step 1016 in FIG. 4 is in the middle range (6 or 7) a high level of mindfulness and process loyalty is required, especially in the documentation. If the cooperation is not agreed by the participants (No-case in step 1016) expressed by a value from 1 to 5 in the K-i-E scale for the decision step 1016 of FIG. 4, the commitment process 100 ends with step 108, since a confrontational situation is detected and the commitment process 100 has to be interrupted or canceled. This requires other negotiation methods or moderation techniques and procedures for which the commitment process can be reused in a different framework.

Figure 11:
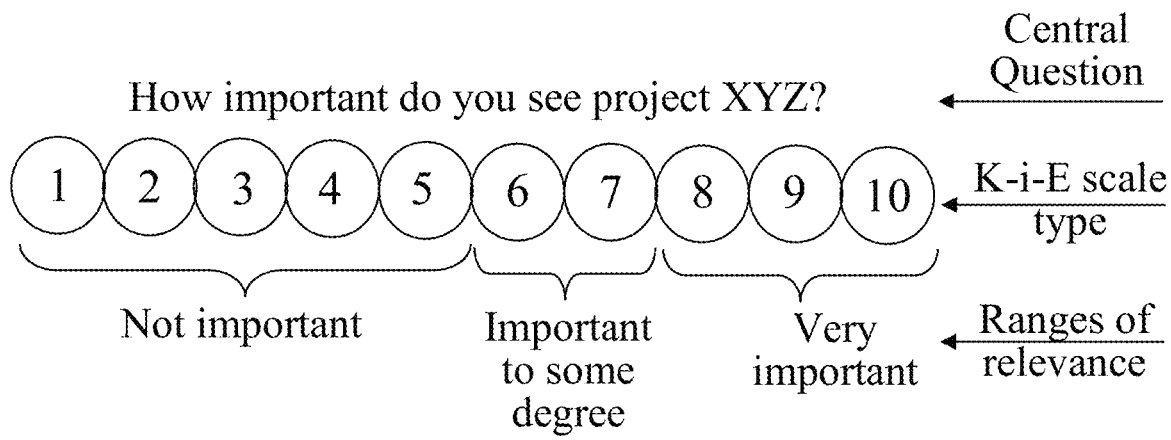
FIG. 11. A general design of the K-i-E-Scale according to the invention.
Figure 11:
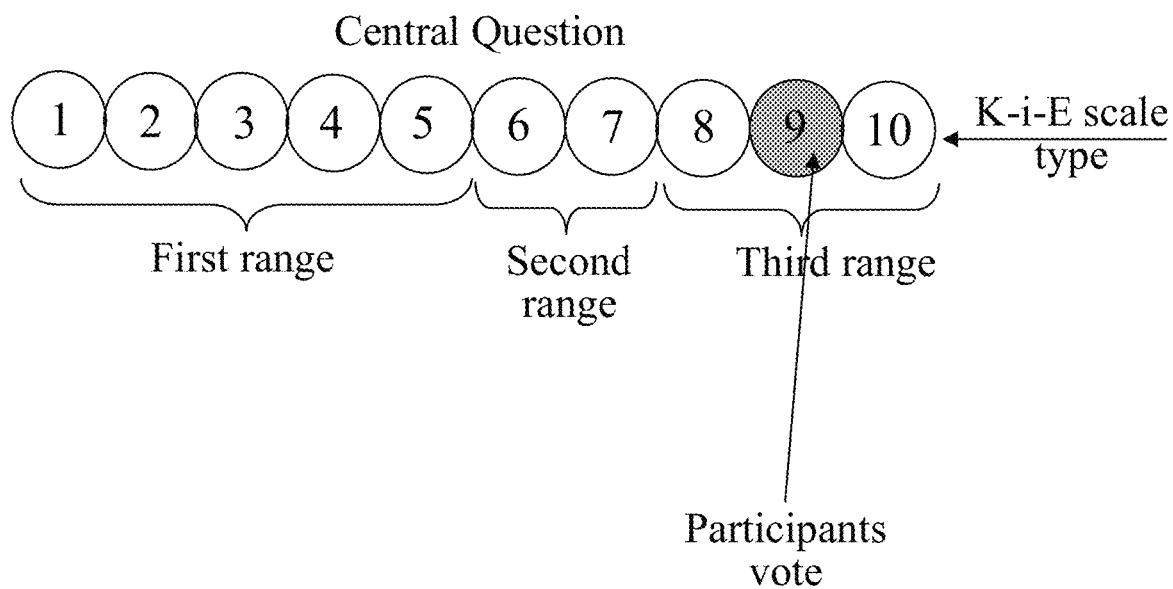

In FIG. 4, exemplary embodiments of K-i-E scales useful for the requirement generation step of FIG. 3 according to the invention are shown that have been introduced when describing the FIG. 3. In FIG. 11, the structure of a K-i-E- scale based question is described and for further details it is kindly referred thereto. According to step 1011, the question "What is the quality of the call for a decision" may be applied to the 10 level K-i-E scale with the values 1 to 5 for identifying that insufficient quality is present, 6 and 7 for identifying that sufficient quality if corrected is present and values 8 to 10 for identifying that sufficient quality is present.

According to step 1014, the question "Are the present authorities capable of making the decision" may be applied to the 10 level K-i-E scale with the values 1 to 5 for identifying that no decision is possible, 6 and 7 for identifying that only preliminary decision is possible and values 8 to 10 for identifying that a decision is possible.

According to step 1016, the question "Is cooperation assured" may be applied to the 10 level K-i-E scale with the values 1 to 5 for identifying that no cooperation is possible (confrontative), 6 and 7 for identifying passive aggressive cooperation and values 8 to 10 for identifying cooperation.

Following an exemplary result of K-i-E scales values for the three decisions in steps 1011, 1014 and 1016 is interpreted. The key scale value for the decision in step 1011 may be "8". So, the quality is defined as sufficient. The key scale value for the decision in step 1014 may be "9". So, the team is able to commit. The key scale value for the decision in step 1016 may be "9". So, a cooperation is assured.

This can be interpreted that the project had matured to good quality through the quality process with the participants in several rounds and communicated to the participants in good time. The responsible persons were present in the kick-off and thus the decision-making ability in the process was directly guaranteed. The cooperation had stabilized after initial difficulties and the frictions from the failed predecessor project by applying the K-i-E tools on a very good level.

Figure 5:
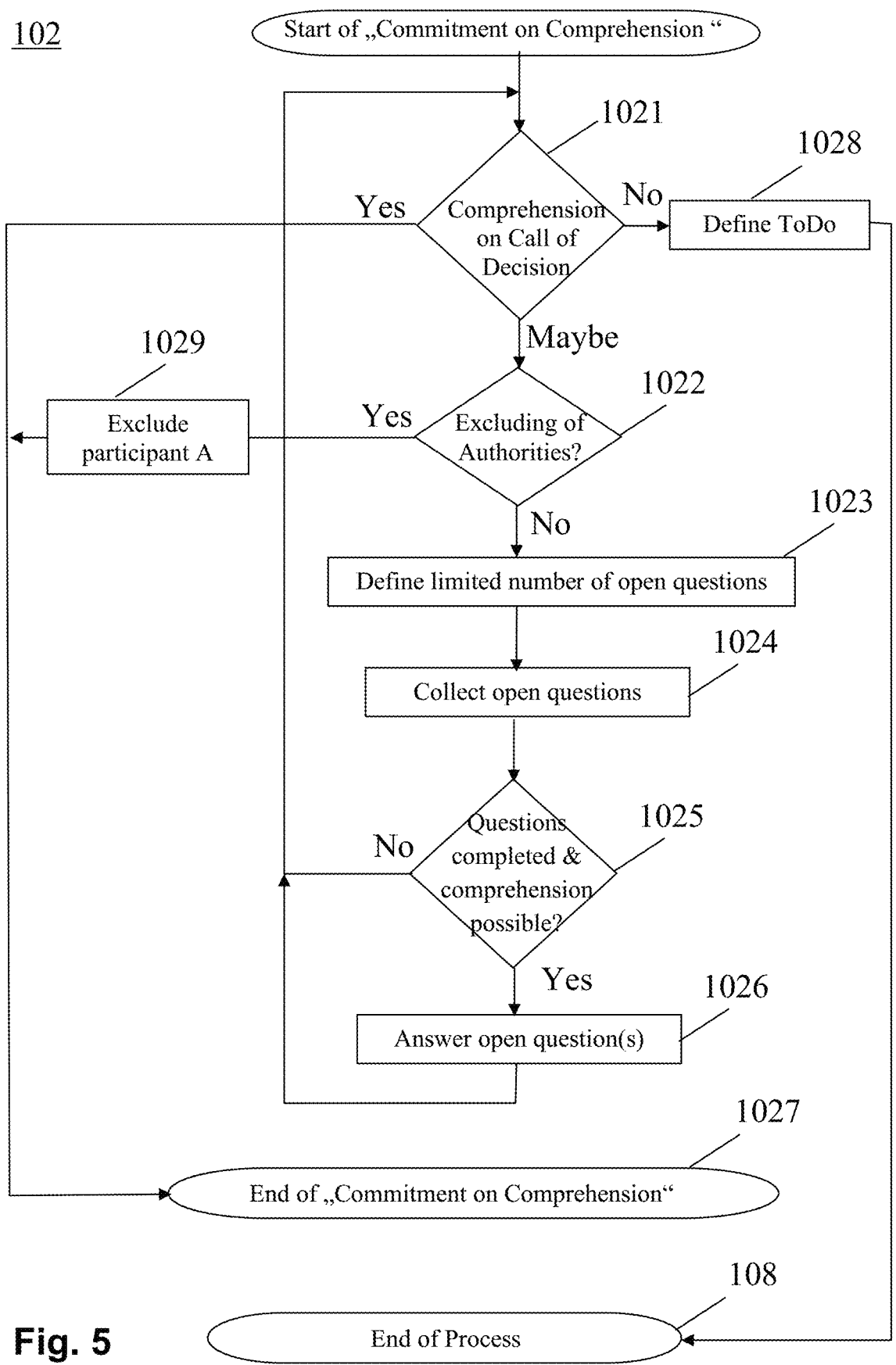
FIG. 5. A flow diagram of an exemplary embodiment of a Commitment on Comprehension step of the commitment process of FIG. 2 according to the invention.
Figure 6:
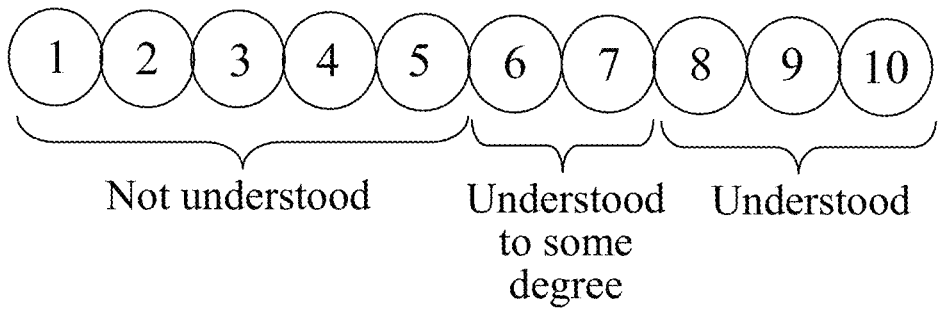
FIG. 6. Exemplary embodiments of K-i-E scales useful for the commitment on comprehension step of FIG. 5 according to the invention.
Figure 6:
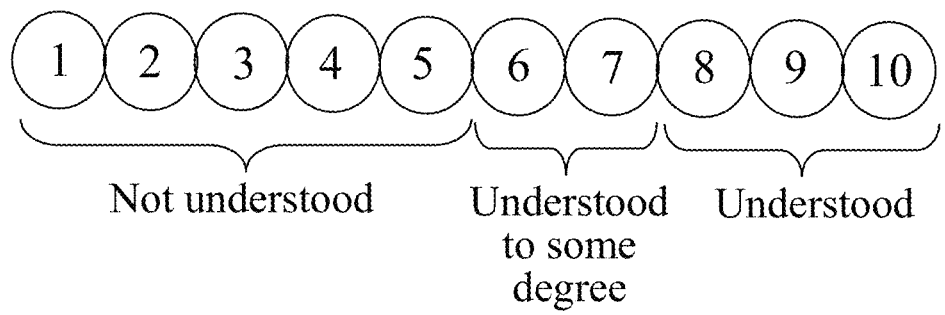
Figure 6:
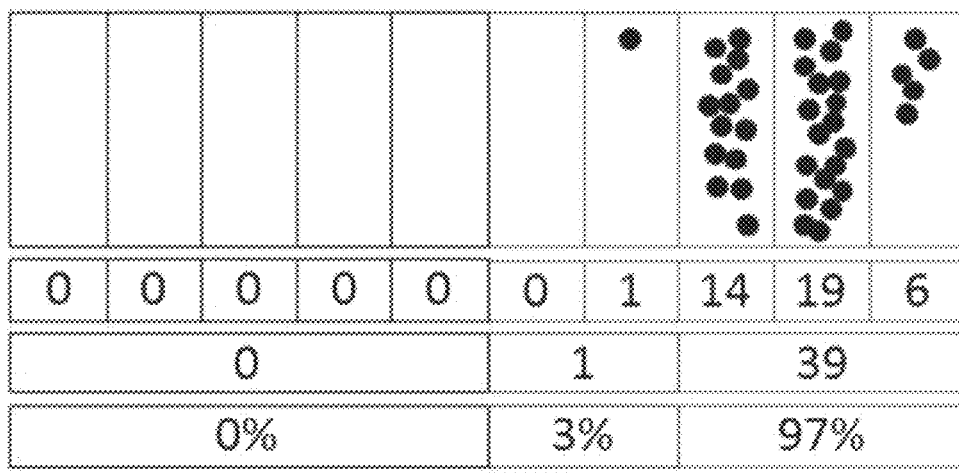

In FIG. 5, a flow diagram of an exemplary embodiment of a commitment on comprehension step 102 of the commitment process 100 of FIG. 2 according to the invention is shown. In FIG. 6, exemplary embodiments of K-i-E scales useful for the commitment on comprehension step 102 of FIG. 5 according to the invention are shown and explained when discussing FIG. 5. A commitment can only be achieved if the subject and the consequences are fully understood by the individual participant in his field of expertise.

So, the step 102 is applied in the process 100 to identify whether the participant can participate the commitment process or not. In step 1021 it is decided whether a comprehension on call of decision is achieved. Here, a K-i-E scale for the decision step 1021 according to FIG. 6 should be used. According to step 1021, the question "How good do you understand the call for decisions" may be applied to the 10 level K-i-E scale with the values 1 to 5 for identifying that the call for a decision is not understood, 6 and 7 for identifying that the call for a decision is not understood to some degree and values 8 to 10 for identifying that the call for a decision is understood.

If a good understanding is present (Yes-case) in step 1021, the commitment on comprehension step 102 ends in step 1027 and the commitment process 100 processes with step 103.

If no understanding is present (No-case) in step 1021, to do items need to be defined in step 1028 and the commitment process 100 ends in step 108.

If some understanding is present (Maybe-case) in step 1021, another decision 1022 is made, namely whether one or some of the participants should be excluded from the actual commitment process 100. Here, another K-i-E scale for the decision step 1022 according to FIG. 6 should be used. According to step 1022, the question "How far do you understand the Project XYZ?" may be applied to the 10 level K-i-E scale with the values 1 to 5 for identifying that the project is not understood at all, 6 and 7 for identifying that the project is not understood to some degree and values 8 to 10 for identifying that the project is understood. As shown in FIG. 6, only one person did understand the project only to some degree. It should be decided to exclude this participant from the actual commitment process 100 (Yes case in step 1022), since obviously, understanding is not complete and commitment process 100 is made without this excluded person. This person is then excluded which is documented in step 1029. Then the commitment on comprehension step 102 ends in step 1027 and the commitment process 100 processes with step 103.

If no person can be excluded (No-Case in step 1022), a limited number of questions is defined in step 1023 and subsequently, open questions are selected in step 1024. Then it is decided in step 1025 whether the questions are complete and whether now a comprehension is now possible?

If questions are missing (No-case in step 1025) the step 1021 is repeated. If all questions are collected (Yes-case in step 1025) than the open questions are answered in step 1026 and the step 1021 is repeated.

This process step 102 in FIG. 5 ensures that only a limited number of comprehension questions are allowed at all. It is assumed that the necessary competence is present and that the participants can close the information gap. So, participants with a lack of understanding are excluded in the process (step 1022), so that the other participants did not come to the commitment process 100 for nothing. For the excluded participants, the commitment process 1029 can be repeated after establishing one's own understanding. The goal herein is always that a tactical or given blockade is not possible. Then assumptions for sub-topics are made, which will then be reviewed later. This prevents all those involved being doomed to inaction because of a few unprepared participants and avoids that the commitment is built on sand.

The process according to steps 1023 to 1026 has been approved as useful to admit a given number of comprehension questions, which are clarified in a two-step procedure. Collecting the questions according to step 1024 includes a visualization of the key question "What questions would you need to clarify here so that you have a sufficient understanding?" The following key question concludes the step 1024 and prevents the further process from being disturbed by questions: "To what extent do you have sufficient understanding when all questions have been answered?" Only when the completeness of the questions has been confirmed in step 1025 the questions are answered in a second step 1026. This enables to create understanding much easier. Then the understanding—transparent to all participants—is again checked in step 1021. This ensures that their understanding of individual participants has not changed. A change of the understand would be interpreted as an in cooperative behavior.

The basic emotions of "shame", "guilt" and "fear (anxiety)", provide to establish understanding through the open process without any additional effort. The two-step process represented by steps 1021 to 1026 is very important. Again, it is about revealing and eliminating any tactical or other blocking behavior of individual participants. The process loyalty establishes openness, courage, respect for the knowing ones, but also for the non-knowing ones. The focus is always preserved, and the goal is never lost.

In FIG. 6, it is assumed that the decision step 1021 provided a "9" which represents that the participants had a very good understanding of the project. However, one of the participants showed a vague understanding (representing a "7") and so was excluded according to the decision step 1023.

Figure 7:
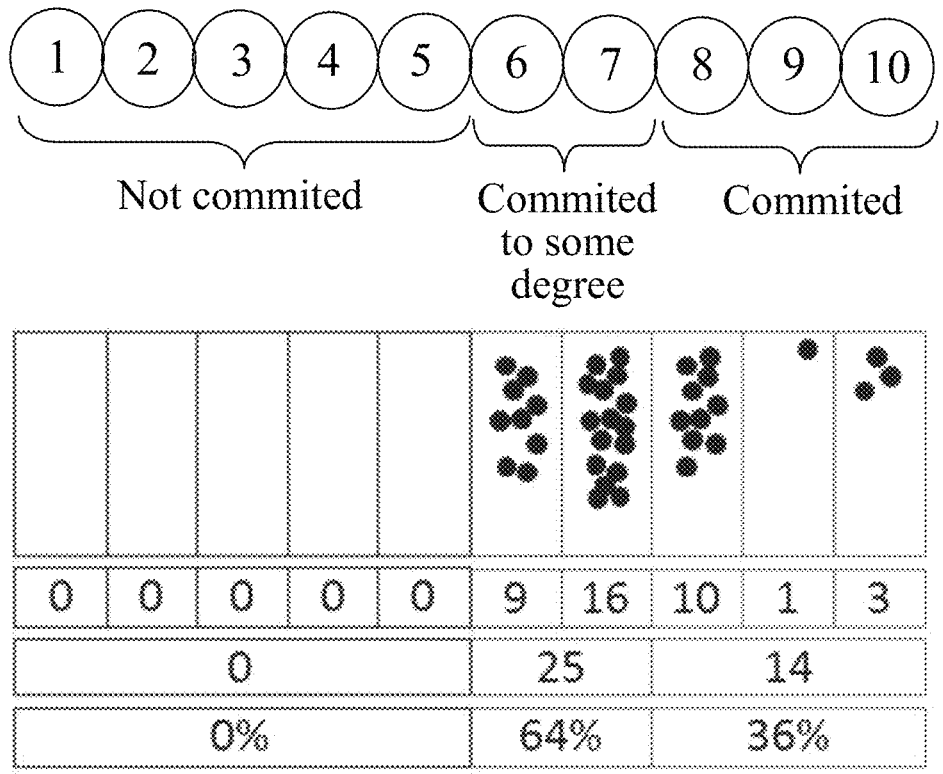
FIG. 7. Exemplary embodiments of K-i-E scales useful for the first commitment step of FIG. 2 according to the invention.

Bearing in mind the process step 103 in FIG. 2, the FIG. 7 shows exemplary embodiments of K-i-E scales useful for the first commitment step 103 of the commitment process 100 of FIG. 2 according to the invention.

With a specifically adapted key question, e.g. "To what extent am I responsible for project planning with time, budget and scope of services?" a first commitment is determined without prior discussion. A quick and open assessment is immediately possible and failure in later stages is unlikely.

Many decision-making requirements are clear and without long speeches and tedious clarifying self-portraits already at this stage of step 103. So, the chance that an exit of the process 100 for a valuable decision 107 is possible without even discussing the subject-matter in detail, and the commitment is obtained very quick. This first commitment 103 has the advantage that within a few seconds, an uninfluenced, jointly accepted determination of points of view are gathered and divergent views become transparent at a glance, and the path to the goal is easy to assess.

Prior tactically enforced options such as targeted time delays or evasions are largely disclosed and prevented. The commitment to show oneself and the duty to show oneself opens the space for solutions. The process 100 prevents individuals from digressing or losing themselves in detail. With high controlled participation and controlled interaction, there is no opportunity to fumble around on the smartphone or tablet. The typical meeting killers are addressed directly with the commitment process 100, without having to position themselves against the disturbers or withdraw from frustration. The repetitive "showing-oneself" required in the design—first as a risk avoider and later as a success seeker—promotes the commitment culture. Diversity is experienced as a value and not devalued with counter-arguments, as it is evaluated first and there is no discussion until this process step 103.

The first commitment step 103 is initiated with a clear positioning by the number of participants who are convinced of success and those who are not. The K-i-E scale according to FIG. 7 enables an obvious view how far the whole team is from a commitment.

The first commitment according to step 103 according to FIG. 7 enables a first look at the team's commitment. It is revealed that the parties were not aligned, and two-thirds were unconvinced that the project had a good chance of succeeding. No one in the team believes that the project has no chance, but the majority did not really believe in the success. The K-i-E scale according to FIG. 7 illustrates that there are reservations or objectives that had not been worked out in the project planning process. It would have been downright negligent, especially on the part of the project managers, to continue this project. The number of participants who—in case of trouble or even it failure—already have the excuse at hand, is in the majority. The expected effort to motivate the team and to convince them of its success would be much too high. The message to the team has to be at this point: "I do not do the project as responsible person." The statement according to the K-i-E scale of FIG. 7 also states that the project may be readjusted with moderate effort, so that the majority of the team members are convinced of the success.

Figure 8:
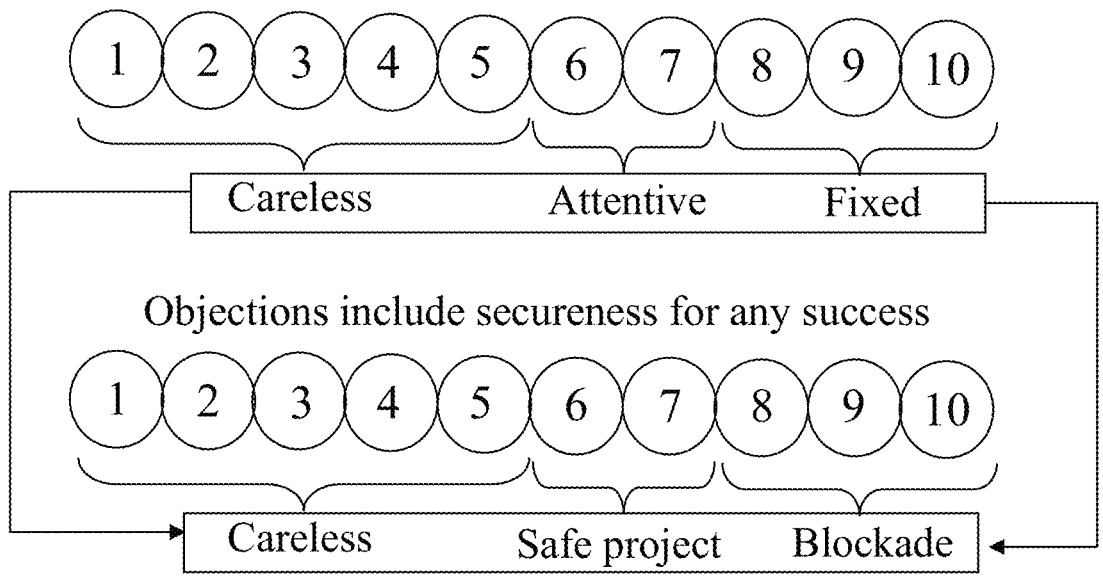
FIG. 8. Exemplary embodiments of K-i-E scales showing the influence of objections in the commitment process of FIG. 2 according to the invention.

According to FIG. 2, the commitment process 100 now suggests the discovery of any objectives. FIG. 8 shows an exemplary embodiment of K-i-E scale influence when objections in the commitment process 100 of FIG. 2 according to the invention are present.

As an essential quality, "anxiety (=fear)" is introduced as a valuable motivator for mindfulness that leads to "secureness (=safety)". Not enough anxiety is careless, too much anxiety leads to a blockage, but a proper care provides security for safety, as the core of success. The objectives (reservations) contain the security for any project success. These objectives must be remedied by exaggerated risk assessments and excessive safety concerns in the dysfunctional area, before working together to develop appropriate measures according to step 105. However, both the powerful influence and the concern for safety are prerequisites for success.

A team will be happy to work on mitigation measures, but it will refuse to follow exaggerated risk considerations or exaggerate action. Many executives and project managers try to dissuade objectives and thereby weaken the commitment process 100 and the project's success. The more the objectives (reservations) are ignored, discouraged or pushed aside, the lower the commitment will be and the greater the project risk for failure becomes.

According to step 103, the first commitment to the project identified parties who are not convinced of the project's success. These participants are now invited to discover their objectives according to step 104 and may be to get those objectives documented.

The K-i-E scale values from 6 to 7 in FIG. 7 express that there are still objections that harbor unknown risks and thus jeopardize success. The K-i-E scale values of 1 to 5 in FIG. 7 express that the participants are not convinced of their success. Both groups are treated equally.

Very experienced experts express with a K-i-E number from 1 to 5 of FIG. 7 that the project is not achievable and cannot be saved with measures. In these teams, the experts are invited to develop alternatives to the original project, which are based on the original premises or targets. This requires a subsequent prioritization process. However, in most cases it is expressed with a low number that the observations and the risk involved are very large.

The following key question sets the right focus and prevents distracting with non-related risks "What reservations must be resolved with a measure so that you can commit?". In view of Step 104 and 105 it is necessary that the team knows that this work secures success and does not prevent it. It is the responsibility and duty to work out the objectives with knowledge and risk experience. It is not enough just to criticize. Those who can assess the risks will be required as the process 100 progresses to develop the measures according to step 105 to ensure the success. In this phase according to step 104 of FIG. 2, the work is mostly done in plenary. For larger groups, it may make sense that these groups are split. If several groups have common objections, these are reassembled in a further process step (not illustrated). The objectives can be recorded and documented in small groups by acclamation. However, it is recommended that the participants secure the objectives themselves by writing. This approach has a number of unique advantages: By writing, the participants must use the cognition and so, impulsive reactions are mitigated from the outset; anchoring effects is counteracted; a joint approach and contribution to the project success is anchored, and thereby the agile values increase. The usual tendencies to increase and decrease or to exclude or limit oneself are replaced by joint work. It creates a working atmosphere at eye level with a common goal to attain. The objectives (reservations) are immediately available for documentation. The work is parallelized, which is essential for larger groups. The Master of the commitment process 100 is relieved and can take care of the process 100 itself.

Figure 9:
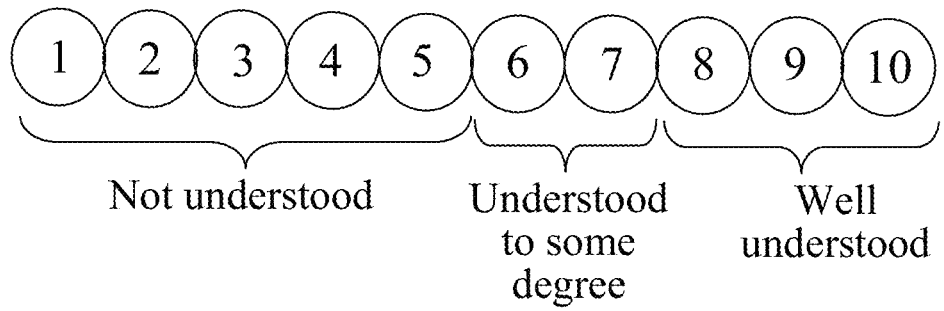
FIG. 9. An exemplary embodiment of a K-i-E scales useful for the discover objections step of FIG. 2 according to the invention.
Figure 9:
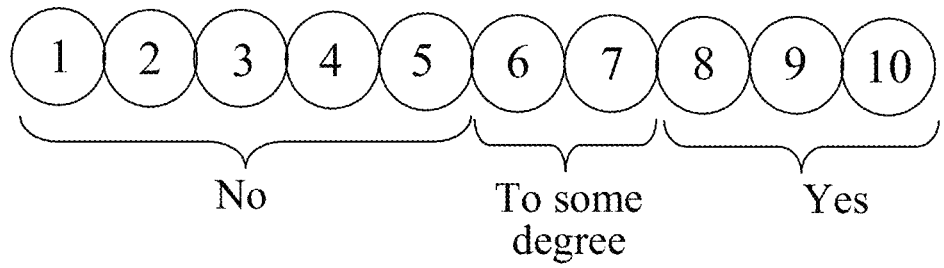

Once all the objectives have been collected, pooled cleanly and clearly documented, this step 104 is completed with two K-i-E scales showing the result of step 104 as K-i-E scale 104-1 and 104-2 as shown in FIG. 9 for understanding and completeness of the reservations.

Understanding the objections of each team member according to K-i-E scale representing the step 104-1 will promote a common view of the open issues and makes the team grow together. The essential result of this process step 104, however, is that a recovery point is created, beyond which the team cannot fall behind. In the further project steps 105 ff, it is assumed that everyone involved knows what it is all about. Later excuses such as "I did not know that" or "those responsible did not appear" are counteracted at an early stage in the commitment process 100. As a consequence, responsibility is more and more transferred to those involved.

With the K-i-E scale 104-2 it is ensured that the commitment process 100 gets a clear scope and a tangible and defined end. In this way, a moving target, i.e. a change in the project objective, is preventively prevented and prevented. It creates a constructive working atmosphere with high motivation.

Together with the determination of the point of view of every participant according to step 103 (the first commitment to the project itself) and the accumulated and discovered objective according to step 104, the participants now get a precise impression of which work lies ahead of them. At the same time a safe reentry point is defined.

According to step 105 of FIG. 2, a transformation into appropriate action is a creative step for the project safety. Both steps 104 and 105 must be clearly separated. The commitment process 100 completely refrains from convincing others. The process 100 takes responsibility for the parties involved and demands that they contribute the competences for mutual success. In the process 100, it promotes respectful treatment and, with regard to content, aims for appropriate measures in step 105 that ensure the success of the project. To develop such measures for risk avoidance or for risk management, the group concentrates on the essentials. This prevents risks from being used as tactical measures for delay and prevention. It becomes transparent to the group what and who are responsible for project security and who acts tactically. Each objective or complex of topics is transferred to a measure by the participants on the basis of their expert knowledge.

Step 105 is usually performed in workshops. The key question: "With which measures are the reservations resolved, so that you can commit?" sets the right focus and prevents it from becoming obsolete. This focus is a key success factor in the workshops and is given as a goal definition. It is not to work out what might be technologically or technically possible or desirable, but what is necessary to ensure the success of the project. It is important in this step 105 of the commitment process 100 that the team knows that this work secures success and does not prevent it.

Following orientation during a workshop may help: There should be always several groups. Even if only two participants are available, each one forms its own working group and works for itself. If possible, two groups or several teams work on an objective in order to preserve the diversity of the results. The results must be documented and then presented to the group. Optionally, a quality process can be performed to allow a common understanding is established.

This procedure ensures that all innovations are always documented and can be set up again at will. Thus, it is possible to react to all disturbances, which characterizes the robustness of the commitment process. K-i-E scales may be used to secure the development of the measures in step 105 (not shown).

According to step 106, the final commitment with the developed measures (yes-case in step 106 of FIG. 2) should only be a formal act in the commitment process 100 and serves again to protect against tactical delays and repetitions. If the steps have been done properly, all objections are identified in step 104 and resolved within the framework of the premises and project specifications in step 105. Everyone involved in the joint work has publicly acknowledged the project's goal. This is how the team is geared, and the commitment and loyalty of all employees are solid. As a result, the jointly supported decision 107 is generated in most efficient manner.

If the final commitment is not achieved (no-case in step 106 of FIG. 2), something has been overlooked, or a tactical measure to prevent the commitment becomes transparent. Both can be solved by repeating the corresponding process steps 104 and 105. In the introductory phase, discreet experts do not always dare to state their objections, especially when they have been ironed out in the past by success factors. These employees are beginning to take heart, then show themselves to be very helpful and contribute their expertise. In teams and companies in which there is a culture in which "observers" or "success seekers" have been devalued or overruled, the introduction takes longer. Confidence increases as the engagement of the commitment process 100 increases. Often, many do not immediately recognize the seriousness and high functionality of the commitment process 100. Some believe that if they do not mention their objectives, past failures would not be revealed, or they might bypass necessary measures. The growing trust and the established agile values ensure that the topics relevant to success are openly and honestly answered and resolved by the team.

With the documentation developed in the commitment process 100, the jointly supported decision 107 (commitment) can be communicated to everyone in an open and coordinated manner in the organization. There are no excuses, no retreat to the usual strongholds and no distancing. If this happens anyway, because new risks have emerged, or measures have failed, this can be cured by repeating the appropriate process step. Objections that have been placed only for self-expression, to compensate for past frictions or for tactical reasons, become very strong through the robust and open commitment process 100. They are quickly uncovered and disappear after a few passages by itself. The new decision-making culture emerges self-organized when the commitment process is applied.

In case the commitment step 106 shows that a decision is never made (NEVER-case in step 106 of FIG. 2), an exit and authoritarian decision is suggested. In that case, there will be an exit and an authoritarian decision A by the master of the commitment process 100. The form of the decision is up to the master. If the measures exceed areas of responsibility or specifications, the final commitment can only be reached after the responsible persons have been reached. Depending on this commitment, then, in effect, a jointly supported decision 107 is made, or the authoritative decision A must take effect, maybe just to enable new commitment process 100 with changed premises. In this case too, the knowledge from the previous decision-making process of the manager is available. That is, the manager becomes more and more rich in experience. However, this never-case in step 106 does not necessarily imply that the commitment process fails. It is mere the combination into an integrative leadership type to enable an exit after a certain period of time or after the development that some objectives are still present and will not be solved by this setup.

In step 107 the jointly supported decision is made, and project success has been achieved. The shared decision 107 includes the decision and the implementations/measures, which is also jointly supported on. Identification and loyalty to the goal are established as a key success factor. The team members only give their commitment if they themselves are convinced of the success and sustainability of the company. The necessary measures will be integrated into the project. All participants are involved, and the process is forced to express themselves and take a viewable position. The divergent perspectives are transparent right from the beginning and through the participation. The compelling inner logic leads to the goal and makes the commitment process a solid, robust tool that copes well with blurring and different as well as adverse situations. The commitment process creates a self-organized process that grows without forcing a culture of openness, commitment, honesty, security, and shared commitment.

The commitment process is considered as a superior decision-making tool for a new integrated leadership style and as the legitimate successor to the post-heroic or post-modern leadership style. It replaces all participatory approaches with genuine shared participation in a jointly supported decision 107.

In corporate governance, the commitment process 100 can preserve the traditional hierarchical organization while at the same time engaging all stakeholders in a jointly supported decision 107. All projects, be they agile or classic, are an ideal area of application. The gap due to the lack of operationalization in SCRUM is effectively closed by the commitment process 100. No relevant step should be taken without the commitment process 100: starting with vision, goal, project approach, technology selection, staffing, kick-off or spin planning, and ending with acceptance or sprint review and sprinting. Retrospective. The newly created leadership situation between traditional areas and agile teams can be bridged with the commitment process 100. In particular, the product owner is not without an interface between the department and the agile teams.

Commitments can persist in the long term. The commitment process 100 is used for all meetings, interview situations, retreats, forums and change projects. Partial aspects can also be examined in order to make a situation assessment clear to all. Ultimately, he aims to build a new culture of decision-making that is characterized by reliable commitments.

The commitment process 100 shows its greatest benefit in standardized rule meetings, but its effect is very demonstrative for individual just critical decision-making needs, especially under the moderation of a Master in the commitment process 100. The application has proved its worth in multi-stage standard processes. This ensures secure commitments such as delivery results in the briefing process, team decisions, acceptance of delivery results and partial deliveries in studies and projects. For the acceptance of all goal definitions, the commitment process 100 is a prerequisite.

A sovereign handling of the K-i-E scale is to be assumed. The need for a decision must have a quality that can be produced with the quality process. Other K-i-E tools, such as the prioritization process or the motivational triangle, are indispensable tools for modifying occurring problems and unforeseeable tasks. These processes are not discussed herein but should be considered when applying the commitment process 100.

In any case, it must be ensured that an evaluation can and must take place without any influence. The implementation requires solid leadership skills. They primarily require experience in the management and organization of meetings and moderation. In addition to a secure appearance, process and content-based understanding of the decision-making requirements for acceptance in the group are advised.

It is recommended to implement the commitment process 100 only in conjunction with a change process with backing and clear goal agreement of the person in charge. The high level of performance and the rapid progress in the commitment process reveal the omissions of the past and those responsible for them. Even if the successes are sensational, it can happen that the managers, usually very experienced managers, ensure that the commitment process is weakened, functionally changed, canceled or marginalized. In the introductory phase, it is strongly recommended to name a Master of the process 100 who will be responsible for process compliance during the implementation. Experienced teams ensure self-organized compliance with the process loyalty. For safety's sake, it is advised to regularly invite a Master the process 100 who supports the commitment process 100 and provides a refresher.

Figure 10:
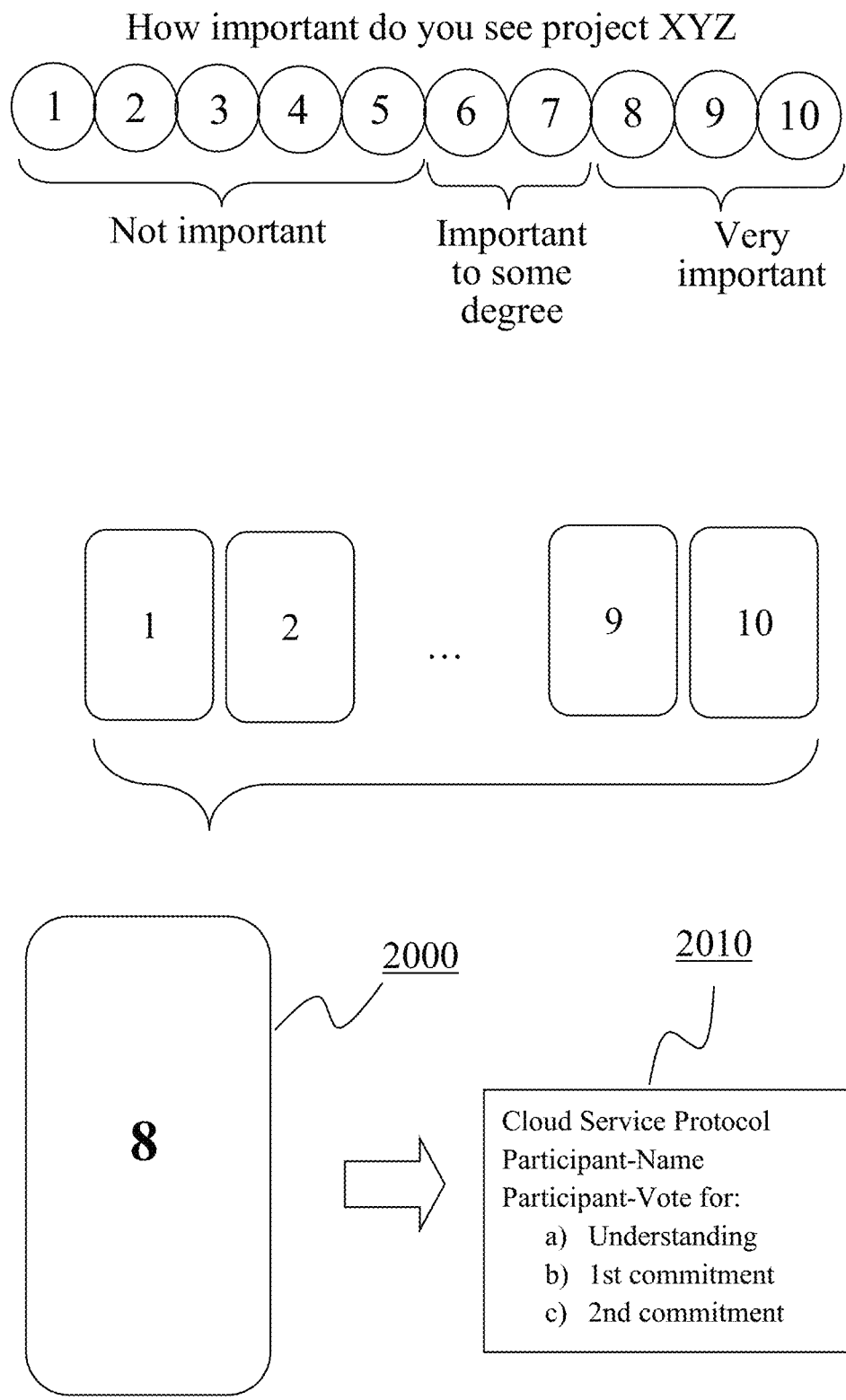
FIG. 10. An exemplary embodiment of a decision maker using a handheld device with respective protocolling as a cloud based service.

The use of K-i-E cards to obtain the numbered answer to questions and the K-i-E app have proved their worth up to a group size of 16 participants. For larger groups, posters with adhesive dots or a software solution like the K-i-E Decision Maker should be used. An exemplary embodiment for such a software solution is illustrated in FIG. 10. Here, an exemplary K-i-E-scaled based question is asked. Each participant comprises a decision maker software installed and running on his handheld device 2000, such as a smart phone running the K-i-E application. Each participant inputs only one of the values 1 to 10 into his handheld device, e.g. by touch inputting means. A confirmation may additionally be required. Subsequently, a decision maker cloud-based service collects all inputted values and protocols the result in a protocol 2010. Such a protocol may contain the following items: Number and Identification of each participant. Votes of each participant for each K-i-E-scale based question. So, the commitment process 100 becomes a high degree on transparency and destructive participants can be identified easily, e.g participants providing unreasoned values. Such participants behavior can be identified quickly and an exclusion from the commitment process 100 of this participant may speed-up the commitment process 100.

So, the inventive commitment process 100 can be implemented as a software solution, e.g. a cloud-based service as shown in FIG. 10. Each participants handheld is connected to the decision maker and runs the K-i-E application on the handheld. A decision making application automates, guides and protocols each step in the commitment process 100. This application may be used to guide a master of the commitment process 100 through the commitment process 100.

The material and the design of the K-i-E scales are to be prepared for specific target groups and topics. Larger groups require more effort. Again, experiential knowledge that has already manifested itself in neural emotional program is of high value. After the commitment process has been introduced, it takes 30 minutes to make simple decisions in groups and more complex ones for up to two hours. With high commitment culture, measurements show a time of 8 minutes for a decision that is pre-eminent with high quality.

FIG. 11 shows a general structure of a K-i-E scale based question. Each K-i-E scale based question has a central question to be asked to each participant, e.g. "How important do you see project XYZ?". This central question has to be answered by each participant. The answer is provided by a 10-level K-i-E scale, ranging from value 1 to value 10. This range is fix, is not extendable and not exchangeable. The 10-level K-i-E scale has different ranges of relevance. These ranges are also fix, namely that values 1 to 5 correspond to a first range, values 6 and 7 correspond to a second range and values 8 to 10 correspond to a third range. The first to third range increases its relevance, starting with the first range being rather low, the second range being higher than the first range but lower than the third range and the third range being the highest relevance. Each participants can choose only one value from this particular K-i-E scale and this chosen value (=vote) is provided to the decision maker for evaluation and protocolling.

One other example without further drawings is provided in the following:

Through repeated experience, individual people develop more fearful or influential neurological emotional programs, which express themselves in behavior as personality profiles (motives): in a "scepticist" and in a "conquester of success". These two are incompatible without an orderly commitment process, causing recurrent disruptions that waste enormous time, losing sight of the goal and frustrating the rest of the team. In the inventive commitment process, these concerns are considered and the strength of both "scepticist" and "conquester of success" is used advantageously.

On exemplary example is the so called "Calibrated Emotional Loop". Such a loop is triggered over and over again when "skepticists" and "conquester of success" are incorporated without control. The emotional feelings of "anxiety" or "anger" arising in this process vary from unpleasant to unbearable depending on the emotional arousal. Every decision maker knows these situations. Sooner or later, escalations and associated frictions will be directly linked to a stimulus. Most of the time, the whole team breathes at the first word, no matter whether they are worried about the subject or their success. As a consequence, the team internally turns away from the project, the focus is lost, no valuable decision is possible, and the success is endangered.

The so-called group dynamics takes its course. Due to his influence "anger", the "conquester of success" triggers/causes "anxiety" in the dysfunctional area at the "sceptistics", which increases a blockade behavior. The blockade again leads to a higher influence ("anger") which finally leads to a blockade in the decision-making process. After such a mutual activation of the neuronal emotional programs in the dysfunctional area in both "scepticist" and "conquester of success", the emotions and the involved accompanying symptoms last even longer. With appropriate emotional arousal and secreted biochemistry, this can last for hours. During this time, decisions and ratings are distorted accordingly. Fatal is the long-term effect when this calibrated loop repeats itself.

The inventive commitment process provides a clever work around for that and such loops vanish in decision-making processes: The commitment process 100 sets an evolutionary and clear order: first concern for security (fear) and then influence (anger) to the opportunity to use. This reduces the likelihood that the loop will reappear. If the team goes into a calibrated emotional loop, it has to do with the commitment process 100 to return to an orderly process.

The commitment process 100 aligns the group and releases the competence of all participants. When the emotions are used in their natural sequence, the group dynamics are aligned to a common goal. The competence of all comes to the development. Of course, this endeavor is supportive, but it does not help much if the competence is blocked by calibrated emotional loops or devalued by escalations. Many projects have sufficient experts and the necessary competence. The participants do not fail because of their individual abilities, but because of the interaction of the emotions, which always act through the inseparability of the decision-making system, whether one wants it or not. It is expected that the effect of calibrated emotional loops with several proven experts will be more significant, especially the effect of the emotional shame.

All features of all embodiments described, shown and/or claimed herein can be combined with each.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a feature of the invention may have been disclosed with respect to only one of several implementations, such feature may be combined with one or more other features of the other implementations as may be desired and advantageous for any given or particular application.

What is claimed is:

1. A system for generating and visualizing a jointly supported decision regarding a project among a plurality of users, the system comprising:
a cloud based computing service that implements a plurality of user interfaces for user inputs;
a dashboard for visualizing the results of said user inputs;
the user interfaces being further configured to instantiate a commitment process by:
presenting a first question along with a prompt to each of the plurality of users to select a numeric button from 1 to 10 on a key scale on the user interface representing the user's answer to said first question such that the selection is stored by the system;
presenting the results of each of the plurality of user's answers on the user interface in a way that is visualized, wherein said visualization comprises:
providing a grid that shows a box for each of the previously provided numeric buttons, wherein a representation is placed in the respective box that corresponds to the numeric selection of each of the plurality of users such that each box comprises a representation for each user that has selected the corresponding numeric button thereby allowing for visualization of how many people selected each respective number; and providing percentages of how many of the plurality of users selected each numeric button or a predetermined subset of numeric buttons;

presenting a second question along with a prompt to each of the plurality of users to select a numeric button from 1 to 10 on a key scale on the user interface representing the user's answer to said second question such that the selection is stored by the system, wherein the second question relates to mindfulness and the scale from 1 to 10 represents a scale of anxiety to secureness;

identifying users who have selected numeric buttons below a predetermined threshold;

defining a number of questions to be considered until the commitment process is aborted;

determining whether the issues that resulted in the lower numeric buttons can be resolved by soliciting responses to said defined number of questions;

if said issues cannot be resolved:
   determining that the project is not achievable;
   developing alternatives to the original project or aborting said project; or
   excluding individual users from the commitment process; and if said issue can be resolved:
   defining at least one parameter associated with the commitment process.

2. A method for generating and visualizing a jointly supported decision regarding a project among a plurality of users, wherein the method is performed by a cloud based computing service that implements a plurality of user interfaces for user inputs, and a dashboard for visualizing the results of said user inputs, the user interfaces being further configured to instantiate the method comprising:

presenting a first question along with a prompt to each of the plurality of users to select a numeric button from 1 to 10 on a key scale on the user interface representing the user's answer to said first question such that the selection is stored by the system;

presenting the results of each of the plurality of user's answers on the user interface in a way that is visualized, wherein said visualization comprises:
   providing a grid that shows a box for each of the previously provided numeric buttons, wherein a representation is placed in the respective box that corresponds to the numeric selection of each of the plurality of users such that each box comprises a representation for each user that has selected the corresponding numeric button thereby allowing for visualization of how many people selected each respective number; and
   providing percentages of how many of the plurality of users selected each numeric button or a predetermined subset of numeric buttons;

presenting a second question along with a prompt to each of the plurality of users to select a numeric button from 1 to 10 on a key scale on the user interface representing the user's answer to said second question such that the selection is stored by the system, wherein the second question relates to mindfulness and the scale from 1 to 10 represents a scale of anxiety to secureness;

identifying users who have selected numeric buttons below a predetermined threshold;

defining a number of questions to be considered until the commitment process is aborted;

determining whether the issues that resulted in the lower numeric buttons can be resolved by soliciting responses to said defined number of questions;

if said issues cannot be resolved:
   determining that the project is not achievable;
   developing alternatives to the original project or aborting said project; or
   excluding individual users from the commitment process; and if said issue can be resolved:

defining at least one parameter associated with the commitment process.

* * * * *